(12) United States Patent
Tanigawa

(10) Patent No.: US 10,536,598 B2
(45) Date of Patent: Jan. 14, 2020

(54) IMAGE PROCESSING DEVICE AND METHOD

(71) Applicant: FUJI XEROX CO., LTD., Tokyo (JP)

(72) Inventor: Tomohiro Tanigawa, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/010,679

(22) Filed: Jun. 18, 2018

(65) Prior Publication Data
US 2019/0124223 A1 Apr. 25, 2019

(30) Foreign Application Priority Data
Oct. 20, 2017 (JP) ................. 2017-203444

(51) Int. Cl.
*H04N 1/60* (2006.01)
*H04N 1/00* (2006.01)
*G06K 15/00* (2006.01)

(52) U.S. Cl.
CPC ..... *H04N 1/00639* (2013.01); *H04N 1/00827* (2013.01); *H04N 1/6097* (2013.01)

(58) Field of Classification Search
None
See application file for complete search history.

(56) References Cited

U.S. PATENT DOCUMENTS

| 7,896,328 | B2 * | 3/2011 | Kawamura | G03G 15/6538 270/32 |
| 2010/0195157 | A1 * | 8/2010 | Sasahara | G03G 15/655 358/1.18 |
| 2019/0071274 | A1 * | 3/2019 | Tanigawa | G03G 15/0849 |
| 2019/0075206 | A1 * | 3/2019 | Tanigawa | H04N 1/0066 |

FOREIGN PATENT DOCUMENTS

| JP | 2012-151586 A | 8/2012 |
| JP | 2016-158113 A | 9/2016 |
| JP | 2017-061385 A | 3/2017 |

\* cited by examiner

*Primary Examiner* — Dov Popovici
(74) *Attorney, Agent, or Firm* — Sughrue Mion, PLLC

(57) ABSTRACT

An image forming device includes: a fold unit that folds an adjustment sheet in which a first adjustment pattern including at least one line segment, and a second adjustment pattern filled in with black are formed, based on a predetermined reference fold position to across the first and second adjustment patterns; an image reader that reads an image of the first adjustment pattern and an image of the second adjustment pattern of the adjustment sheet with the adjustment sheet unfolded; a position identifying unit that identifies a position of a fold line based on distortion of the line segment on the image of the first adjustment pattern, or a fold line on the image of the second adjustment pattern; and a position adjusting unit that adjusts a fold position of the fold unit based on a difference between the position of the fold line and the reference fold position.

20 Claims, 14 Drawing Sheets

FIG. 5A

```
SELECTION OF ADJUSTMENT ITEM
   PLEASE SELECT ADJUSTMENT ITEM.

[ ALIGNMENT ADJUSTMENT ]
   [ TRANSFER VOLTAGE ADJUSTMENT ]
   [ FINISHER ADJUSTMENT ]
```

FIG. 5B

```
FOLD POSITION ADJUSTMENT
(SELECTION OF FOLD PATTERN)
   PLEASE SELECT FOLD PATTERN TO BE ADJUSTED.

[ HALF FOLD ]
   [ INNER TRIPLE FOLD ]
   [ Z FOLD ]
   [ CREASING ]
         :
```

FIG. 5C

```
FOLD POSITION ADJUSTMENT
(SELECTION OF PAPER)
   PLEASE SELECT PAPER TO BE ADJUSTED.

[ TRAY 1: PLAIN PAPER ]
   [ TRAY 2: HEAVY PAPER ]
   [ TRAY 3: COATED PAPER ]       ( START TO GENERATE
   [ TRAY 4: THIN PAPER ]           ADJUSTMENT SHEET )
         :
```

IMAGE PROCESSING DEVICE AND METHOD

CROSS-REFERENCE TO RELATED APPLICATIONS

This application is based on and claims priority under 35 USC 119 from Japanese Patent Application No. 2017-203444 filed on Oct. 20, 2017.

BACKGROUND

Technical Field

The present invention relates to an image processing device and a method.

SUMMARY

According to an aspect of the invention, there is provided an image forming device including: a fold unit that folds an adjustment sheet in which a first adjustment pattern including at least one line segment, and a second adjustment pattern filled in with black or a highly concentrated color are formed, based on a predetermined reference fold position so that the adjustment sheet is folded across the first adjustment pattern and the second adjustment pattern; an image reader that reads an image of the first adjustment pattern of the adjustment sheet and an image of the second adjustment pattern of the adjustment sheet with the adjustment sheet once folded by the fold unit unfolded; a position identifying unit that identifies a position of a fold line based on distortion of the line segment, which appears on the image of the first adjustment pattern, or a fold line which appears on the image of the second adjustment pattern; and a position adjusting unit that adjusts a fold position of the fold unit based on a difference between the position of the fold line identified by the position identifying unit, and the reference fold position.

BRIEF DESCRIPTION OF THE DRAWINGS

Exemplary embodiment of the present invention will be described in detail based on the following figures, wherein:

FIGS. 5A to 5C are screens illustrating an example of a setting screen for the fold position adjustment processing;

DETAILED DESCRIPTION

Hereinafter, an exemplary embodiment of the invention will be described with reference to the drawings.

Figure 1:
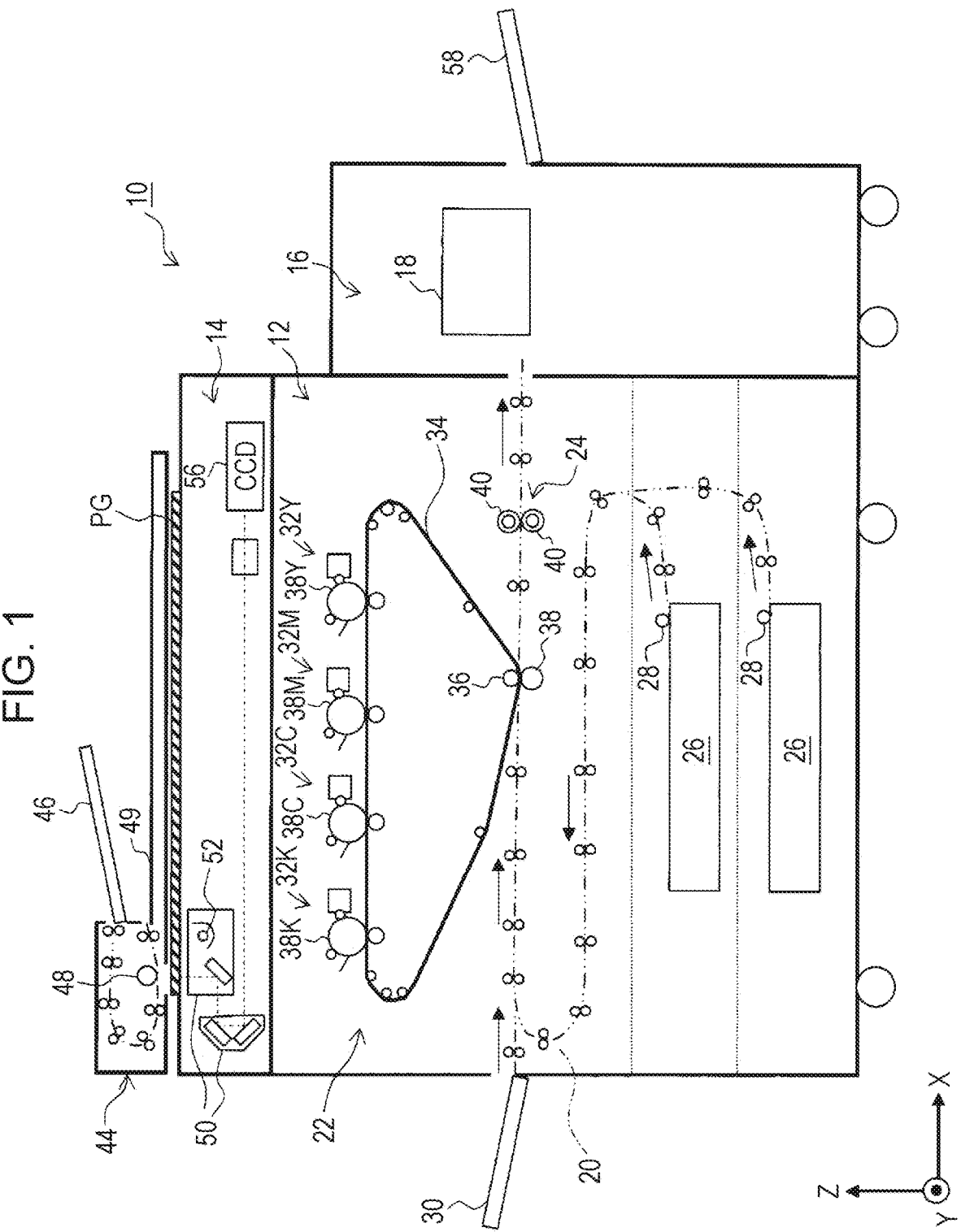
FIG. 1 is a schematic configuration view of an image forming device.

FIG. 1 is a schematic configuration view of an image forming device. An image forming device 10 includes an image former 12 that forms an image on recording paper, an image reader 14 which is an image scanner that reads the image of a document, and a post processor 16 which is a finisher that performs fold processing on the recording paper.

The image forming device 10 in the exemplary embodiment is, for instance, a copy machine that has a copy function of forming an image of a document on the recording paper by the image former 12, the document being read by the image reader 14. Also, the image forming device 10 in the exemplary embodiment is connected to, for instance, a personal computer (hereinafter referred to as a PC) via a network, and performs printing by the image former 12 based on image data inputted as a print job from a PC. The image forming device 10 receives an instruction for fold processing to be performed on the recording paper from a user interface (hereinafter referred to as a UI) provided in the device body or a PC, and a fold unit 18 of the post processor 16 performs fold processing on the recording paper. As described below, the image forming device 10 adjusts the fold position of the recording paper by the fold unit 18.

The image former 12 includes a transport path 20 for transporting the recording paper, a toner image former 22 that forms a toner image on the recording paper, and a fixing unit 24 that fixes a toner image on the recording paper. Also, the image forming device 10 includes multiple sheet trays 26 in which sheets of recording paper are to be stored. Although FIG. 1 illustrates two sheet trays 26, actually more than two sheet trays 26 are provided. In each of the sheet trays 26, sheets of recording paper are stored according to a type (such as a kind, and size) of the recording paper, for instance.

The uppermost sheet of recording paper among multiple sheets of recording paper stored in the sheet trays 26 is to be delivered to the transport path 20 by a delivery roller 28. The transport path 20 has one end connected to each sheet tray 26 and the other end connected to a transport path (not illustrated) of the post processor 16 through the toner image former 22. Thus, the recording paper delivered from the sheet trays 26 to the transport path 20 is transported to the toner image former 22, and subsequently, is transported to the post processor 16 through the fixing unit 24.

As illustrated in FIG. 1, the image forming device 10 includes a bypass tray 30. The recording paper placed on the bypass tray 30 is also delivered to the transport path 20, and is transported to the toner image former 22, and subsequently, is transported to the post processor 16 through the fixing unit 24.

The toner image former 22 includes developing units 32Y, 32M, 32C, and 32K having respective colors of yellow (Y), magenta (M), cyan (C), and black (K), and an endless transfer belt 34 as an intermediate retention body. The transfer belt 34 is wound around multiple rollers including the transfer roller 36 near the transport path 20, and is rotationally driven. Also, the transfer belt 34 is in contact with photoconductor drums 38Y, 38M, 38C, and 38K which are provided in the developing units 32Y, 32M, 32C, and 32K.

The toner image former 22 is to receive input of image signals (raster data) having respective colors of Y, M, C, and K generated based on image data. The toner image former 22 forms toner images in colors of Y, M, C, and K in the respective photoconductor drums 38Y, 38M, 38C, and 38K of the developing units 32Y, 32M, 32C, and 32K based on the image signals, and the toner images are superimposed on the transfer belt 34 and transferred.

In the transfer roller 36, a roller 38 (bias transfer roller) is provided to be opposed to the transfer roller 36, and the recording paper is delivered between the transfer roller 36 and the roller 38, and is sandwiched between the transfer roller 36 and the roller 38 along with the transfer belt 34. Consequently, the recording paper is delivered while toner images of the transfer belt 34 are being transferred to the recording paper.

The fixing unit 24 includes a pair of fixing rollers 40, and the recording paper on which toner images have been transferred is delivered between the fixing rollers 40. The fixing unit 24 sandwiches the recording paper, which is delivered between the fixing rollers 40, heats the recording paper while pressurizing the recording paper, and delivers the recording paper on which toner images are fixed. Consequently, an image according to the image data is formed on the recording paper.

A general configuration using an electrophotographic system may be applied to the image former 12 described above, and a detailed description is omitted.

The image forming device 10 includes an automatic document transporter 44. The automatic document transporter 44 is supported on a platen glass PG (hereinafter simply referred to as a platen PG for the sake of convenience) which is a document base. It is to be noted that the platen PG configurates part of the image reader 14 (image scanner). The automatic document transporter 44 has a document sheet supply tray 46 in which multiple documents having an image to be read are placed in the stack. Each of multiple documents placed in the document paper supply tray 46 is sequentially passed through a copy position on the platen PG, in other words, a pressure-contact position of a platen roller 48 of the document transporter 44, and is discharged to a document paper output tray 49. The automatic document transporter 44 is rotatable with respect to the platen PG upper surface around a rotation shaft (not illustrated) provided at the rear end, which extends in a crosswise direction (the X-axis direction of FIG. 1). When a user or the like places a document on the platen PG by a hand, the automatic document transporter 44 is rotated upward.

The image reader 14 (image scanner) includes the platen PG, and an exposure optical system 50 that is disposed below the platen PG and reads a document image. The exposure optical system 50 includes a light source 52 and multiple mirrors. A document transported to the platen PG upper surface and passed through a copy position by the automatic document transporter 44 or a document manually placed on the platen PG is irradiated with light from the light source 52, and a reflection light from the document is passed through the exposure optical system 50 and converted to an electrical signal by a solid-state imaging charge coupled device (CCD) 56. It is to be noted that when an image of a manually placed document on the platen PG is read, the exposure optical system 50 moves in the X-axis direction of FIG. 1, and scans the document. It is to be noted that the exposure optical system 50 corresponds to a scanner.

A general configuration of, for instance, a CCD image scanner may be applied to the image reader 14 described above, and a detailed description is omitted.

The finisher serving as the post processor 16 includes the fold unit 18 that performs fold processing on the recording paper transported from the image former 12, and a discharge tray 58. The fold unit 18 folds the recording paper by a set folding method such as half fold, inner triple fold, and Z fold, and discharges the recording paper to the discharge tray 58. It is to be noted that the post processor 16 may include a booklet creator (not illustrated) that creates a booklet by stacking multiple sheets of recording paper, saddle stitching the stacked sheets of recording paper, and half-folding the sheets of recording paper, and a stapler (not illustrated) that stacks multiple sheets of recording paper, and staples the stacked sheets of recording paper at a predetermined position of the peripheral edge. A publicly known configuration in related art may be applied to the fold unit 18, the booklet creator, and the stapler.

Figure 2A:
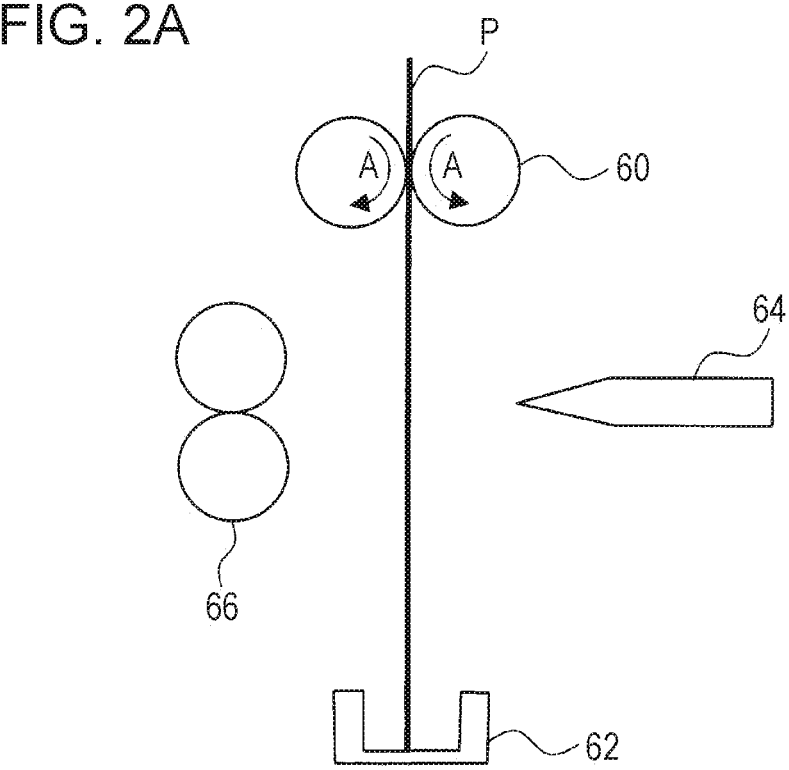
FIGS. 2A and 2B are schematic views of an example of a mechanism of a fold unit.
Figure 2B:
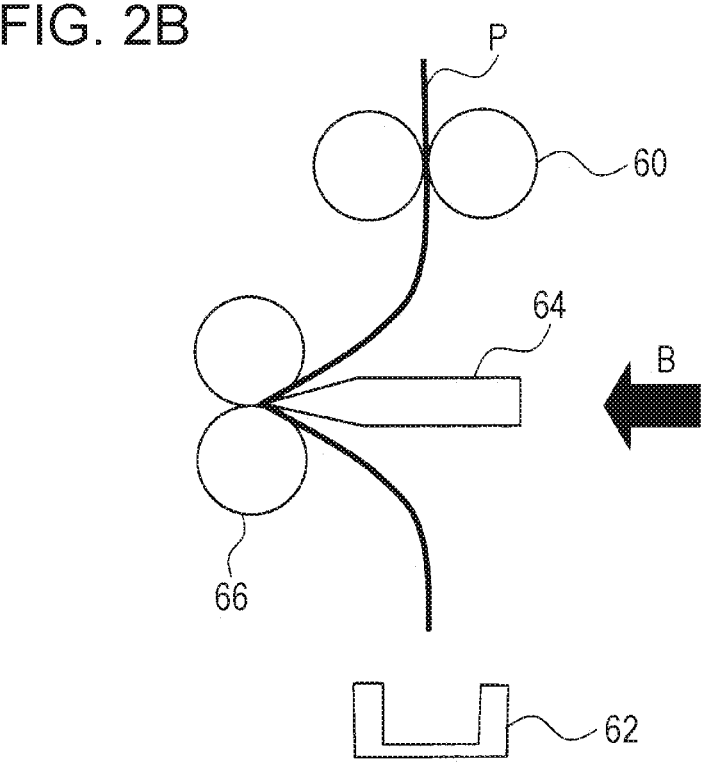

FIGS. 2A and 2B are schematic views of an example of folding mechanism of the fold unit 18.

As illustrated in FIG. 2A, recording paper P is transported by a pair of transport rollers 60 which are rotated in the direction of an arrow A, and is bumped against a gate 62. When the recording paper P is bumped against the gate 62, transportation is stopped. When the transportation is stopped, as illustrated in FIG. 2B, a knife-shaped folding member 64 moves to a pair of folding rollers 66 in the direction of an arrow B, and pushes the recording paper P into the pair of folding rollers 66. Consequently, the recording paper P is folded by the pair of folding rollers 66.

The fold position of the recording paper P depends on, for instance, the amount of deflection of the recording paper P pushed out from the pair of transport rollers 60. The recording paper P may be deflected depending on paper characteristics (such as the thickness, and the degree of elasticity of recording paper P), and the amount of deflection may vary. Thus, the fold position has to be adjusted according to the paper characteristics of the recording paper P. It is to be noted that the fold position of the recording paper P may vary due to a factor other than the "amount of deflection" mentioned above.

Figure 3:
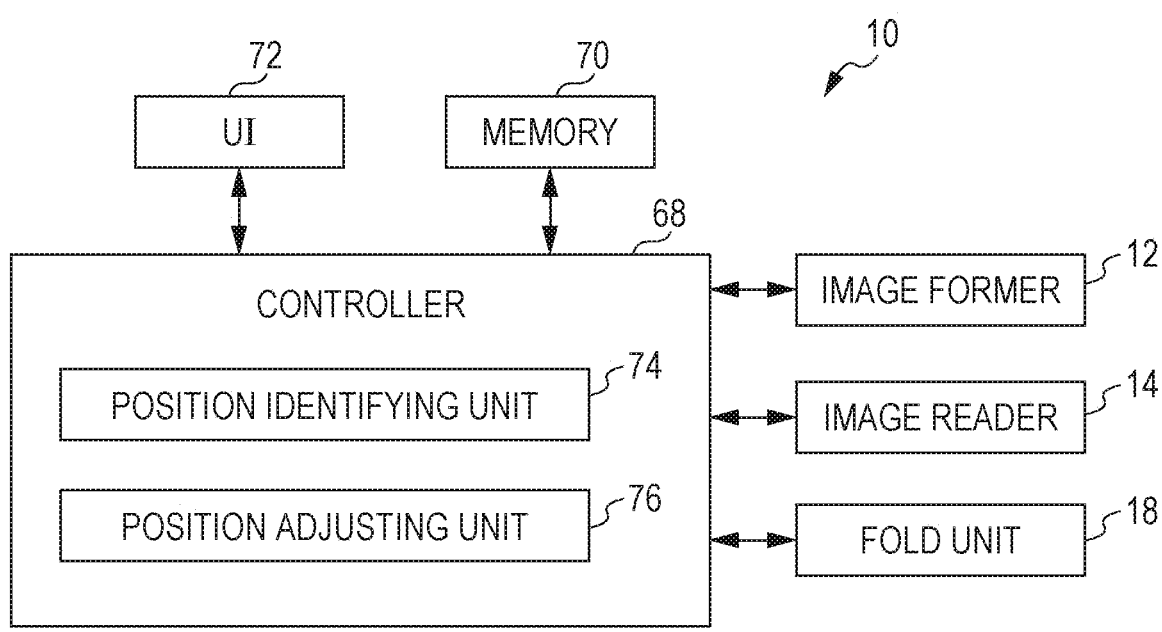
FIG. 3 is a diagram illustrating a control configuration of fold position adjustment processing of the image forming device.

FIG. 3 is a block diagram illustrating the control configuration of fold position adjustment processing of the image forming device 10 in the exemplary embodiment. The image forming device 10 includes a controller 68, a memory 70, and a user interface (UI) 72. The controller 68 includes a processor such as a CPU, and executes processing in accordance with a program stored in the memory 70. Thus, the controller 68 functions as the later-described position identifying unit 74, and position adjusting unit 76. The memory 70 is a ROM, a RAM, or a flash memory or the like, and stores a program executed by the controller 68, and an adjustment value, temporary data determined by the fold position adjustment processing. The UI 72 displays a setting screen in the fold position adjustment processing, and receives an operation from a user or a serviceman or the like (hereinafter referred to as a user). The controller 68 is connected to the image former 12, the image reader 14, and the fold unit 18, and can control each of these components.

Figure 4:
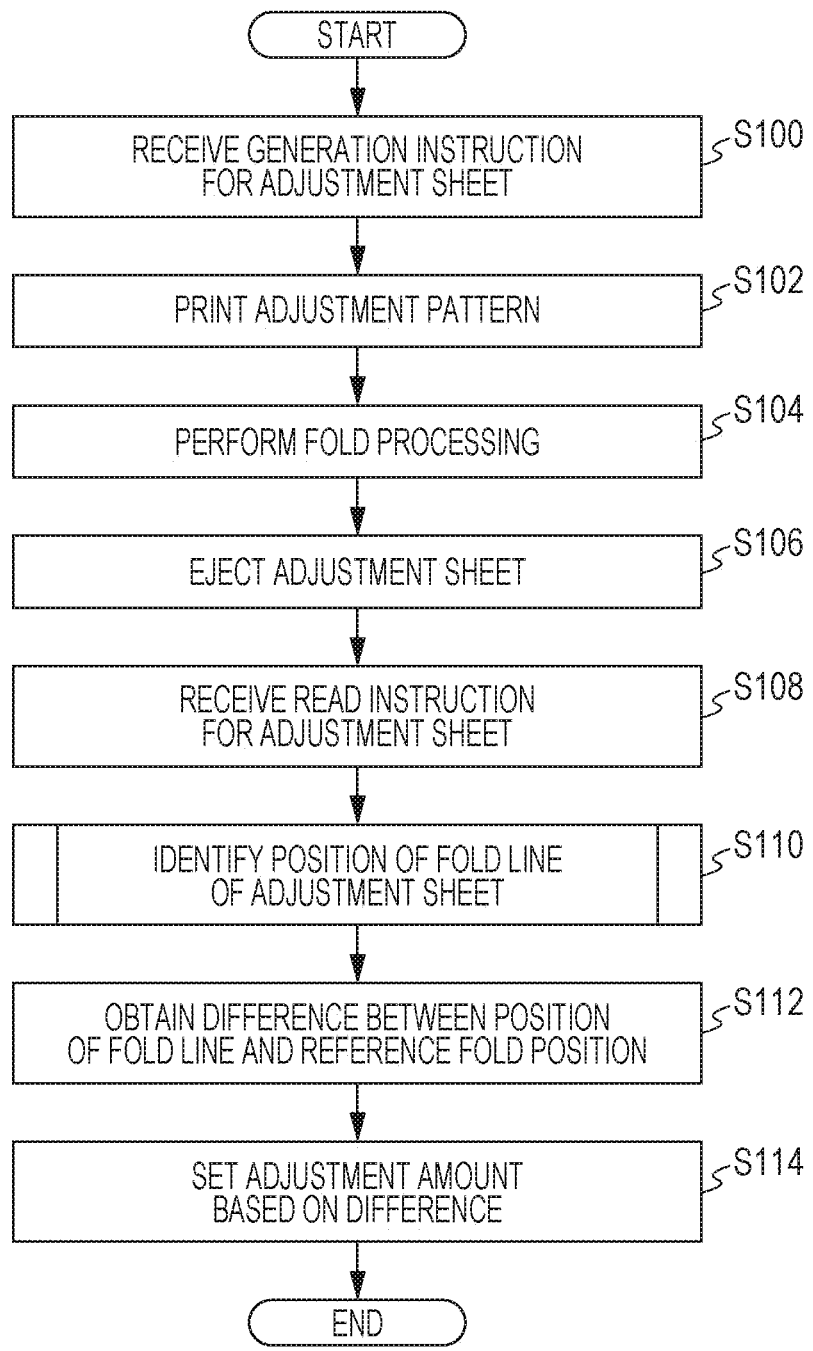
FIG. 4 is a flowchart illustrating the flow of the fold position adjustment processing of the image forming device.

FIG. 4 is a flowchart illustrating the flow of the fold position adjustment processing of the image forming device 10. In the exemplary embodiment, the fold position adjustment processing is performed by executing the flow of FIG. 4 for each of the types of recording paper and for each of the fold patterns of recording paper.

First, in step S100, the controller 68 receives a generation instruction for an adjustment sheet via the UI 72. FIGS. 5A to 5C are each an example of a setting screen of the fold position adjustment processing and an adjustment sheet generation instruction receiving screen displayed on the UI 72. First, a selection screen for adjustment item illustrated in FIG. 5A is displayed, and "finisher adjustment" is selected by a user, for instance. Next, a selection screen for fold pattern illustrated in FIG. 5B is displayed, and a fold pattern to be adjusted is selected by a user. Next, a selection screen for recording paper (paper) illustrated in FIG. 5C is displayed, and recording paper to be adjusted is selected by a user. Although only the types of paper are illustrated and paper sizes are not illustrated in FIG. 5C, a paper size (for instance, A3, A4, or B5) may be selected in addition to a type of paper.

When the "start to generate adjustment sheet" button illustrated in FIG. 5C is touched, a generation instruction for an adjustment sheet is received. When a generation instruction for an adjustment sheet is received, the controller 68 controls the image former 12, supplies the recording paper from the paper tray 26 which stores the recording paper (paper) selected in FIG. 5C, and delivers the recording paper to the transport path 20. It is also possible for a user to place the recording paper selected in FIG. 5C in the bypass tray 30, and to supply the recording paper from the bypass tray 30 by touching the "start to generate adjustment sheet" button, and to deliver the recording paper to the transport path 20. The supplied recording paper serves as an adjustment sheet. It is to be noted that an adjustment sheet may also be referred to as a "sheet".

Figure 6A:
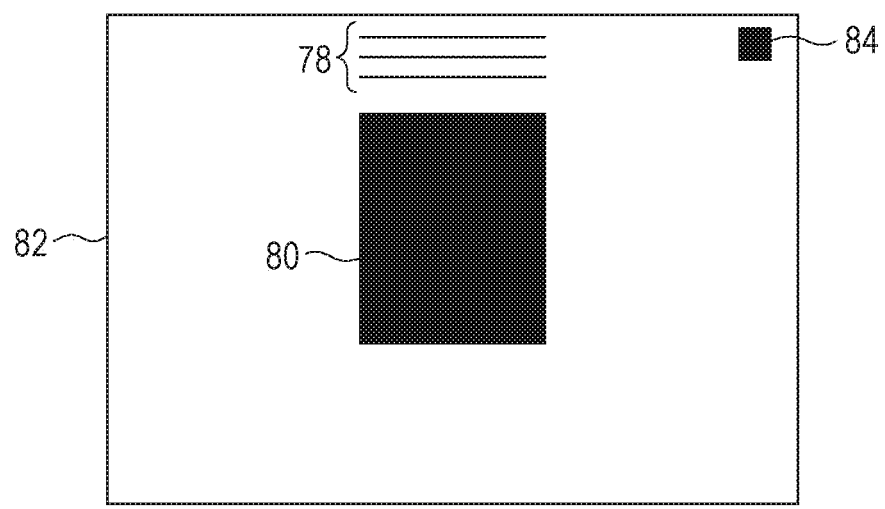
FIG. 6A is a view illustrating an example of an adjustment sheet on which an adjustment pattern is printed.

Next, in step S102 of FIG. 4, the controller 68 controls the image former 12 so that a predetermined adjustment pattern is printed on the recording paper (adjustment sheet) supplied from the paper tray 26 or the bypass tray 30. FIG. 6A is a view illustrating an example of an adjustment sheet 82 on which an adjustment pattern is printed. As illustrated in FIG. 6A, the adjustment pattern includes a first adjustment pattern 78 and a second adjustment pattern 80. The first adjustment pattern 78 is one or more (at least one) line segments printed on an area near an edge of the adjustment sheet 82, and is printed (formed) across an area in which the adjustment sheet 82 is folded by the fold unit 18 of the post processor 16. Also, the second adjustment pattern 80 is a pattern (patch) filled in with black or a highly concentrated color and is printed in an area inwardly of the first adjustment pattern 78 in the adjustment sheet 82, and is printed (formed) in an area in which the adjustment sheet 82 is folded by the fold unit 18 of the post processor 16. It is to be noted that the mark (reference edge mark 84) printed in a corner area of the adjustment sheet 82 of FIG. 6A indicates an edge as a reference in the adjustment sheet 82.

In FIG. 6A, three line segments are printed as the first adjustment pattern 78 near the upper edge of the adjustment sheet 82. However, the position of the first adjustment pattern 78 is not limited to near the upper edge. Also, the number of line segments may be a number other than three. For instance, one line segment may be printed either near the upper edge or near the lower edge.

Each line segment included in the first adjustment pattern 78 is printed with only the toner of K color, for instance. Alternatively, the line segment is printed in black by mixing each toner of C color, M color, and Y color, for instance. Also, the line segment may have a gray color having a predetermined concentration, or a color other than black, having a predetermined concentration. The number of line segments, the color, length, and position on the adjustment sheet 82 of each line segment included in the first adjustment pattern 78 are pre-stored in the memory 70, for instance.

The second adjustment pattern 80 is printed with only the toner of K color, for instance. Alternatively, the second adjustment pattern 80 is printed in black by mixing each toner of C color, M color, and Y color, for instance. Also, the second adjustment pattern 80 may have a gray color having a predetermined concentration, or a color other than black, having a predetermined concentration. The color, size, and position on the adjustment sheet 82 of the second adjustment pattern 80 are pre-stored in the memory 70, for instance. It is to be noted that the pattern which is the second adjustment pattern 80 and filled in with black or a highly concentrated color may have a uniform concentration in the pattern to some extent. The concentration is not necessarily uniform in a strict sense, and includes varying concentration which may occur depending on design or operation, for instance. Also, the highly concentrated color is high enough to allow the position (color having a low concentration) of a fold line to be detected. The concentration which appears as the position of a fold line may be the one which facilitates comparison with a low color.

Figure 6B:
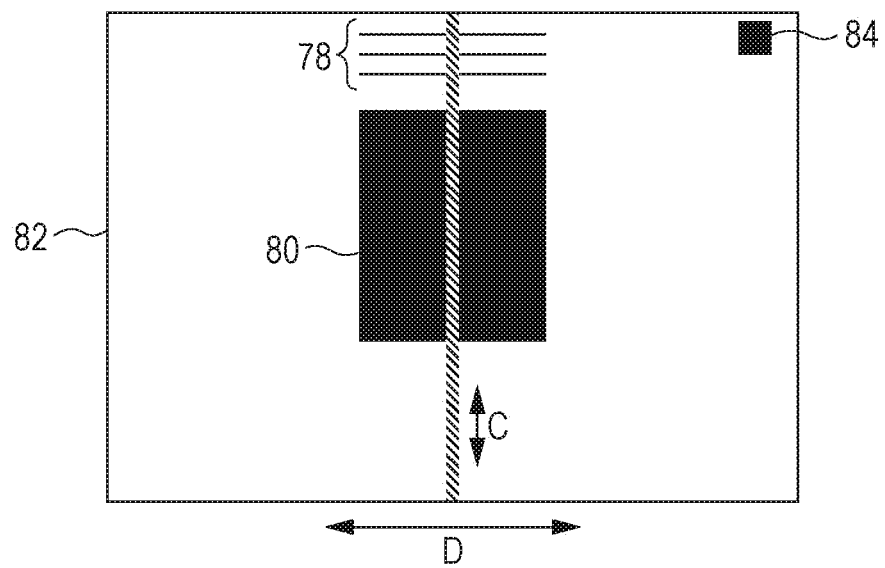
FIG. 6B is a view illustrating an example of a state of the adjustment sheet on which fold processing is performed.

In step S102 of FIG. 4, after the adjustment pattern is printed on the adjustment sheet, the adjustment sheet is delivered to the post processor 16. In step S104, the controller 68 controls the fold unit 18 so that fold processing is performed on the adjustment sheet. The fold processing is performed using a fold pattern selected in FIG. 5B. FIG. 6B is a view illustrating an example of the adjustment sheet 82 (with unfolded) on which fold processing is performed after "half fold" is selected in FIG. 5B. The fold position is illustrated by an oblique line in FIG. 6B. The fold position of the adjustment sheet 82 is pre-stored as a reference fold position in the memory 70, for instance. In other words, the reference fold position is a predetermined fold position. Although the fold unit 18 performs fold processing on the adjustment sheet 82 in accordance with a reference fold position, an actual fold position may deviate from the reference fold position. Here, the fold unit 18 performs fold processing across the first adjustment pattern 78 and the second adjustment pattern 80. It is to be noted that as illustrated in FIG. 6B, the reference edge mark 84 indicates an edge as a reference in a direction (crossing direction) D crossing a direction C along the fold of the adjustment sheet 82.

Figure 7:
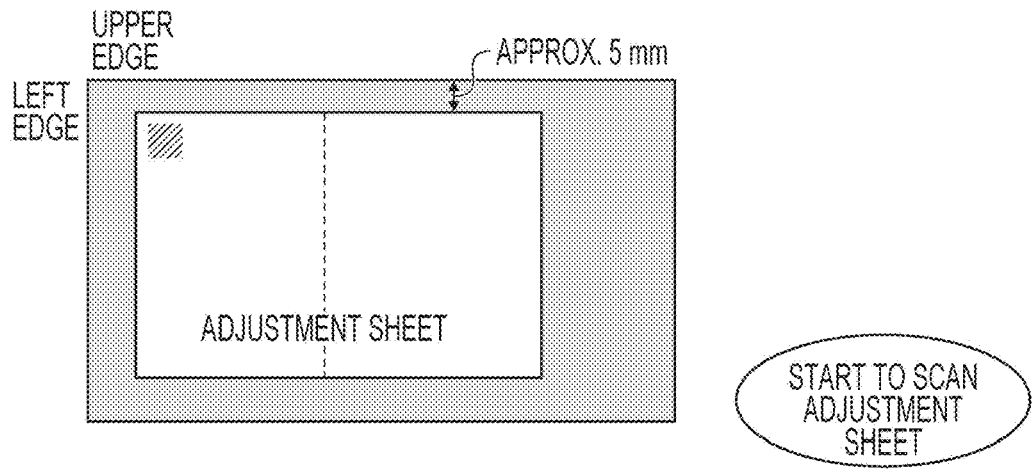
FIG. 7 illustrates an example of a guide screen when an adjustment sheet in the fold position adjustment processing is placed on a platen.

Next, in step S106 of FIG. 4, the controller 68 discharges the adjustment sheet folded by the fold unit 18 to the discharge tray 58. A user then unfolds the adjustment sheet (folded adjustment sheet) discharged from the discharge tray 58, and places the unfolded adjustment sheet on the platen glass PG of the image reader 14. FIG. 7 illustrates an example of a guide screen for placing the adjustment sheet displayed on the UI 72 on the platen PG. As illustrated in FIG. 7, the UI 72 displays guidance indicating that the adjustment sheet should be placed away from the edge of the platen PG. Also, guidance is displayed, which indicates that the reference edge mark (■ mark) printed at a corner area of the adjustment sheet should be located at the upper left corner, and the side of the adjustment sheet, on which the reference edge mark (and the adjustment pattern) are printed, should face the platen PG surface. A user unfolds and places the adjustment sheet on the platen PG in accordance with the guidance.

Figure 8:
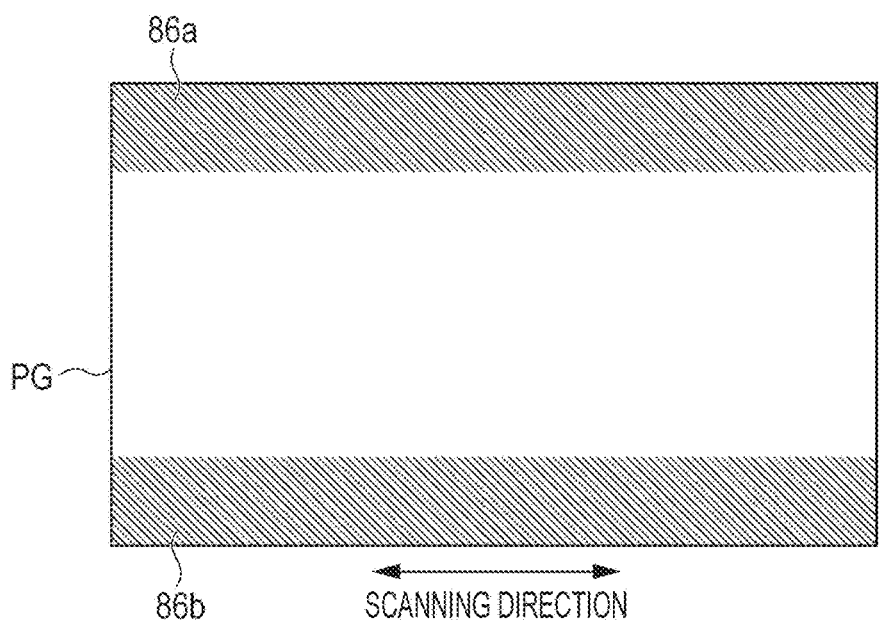
FIG. 8 is a view illustrating an area in which a first adjustment pattern in the platen is effective.
Figure 9:
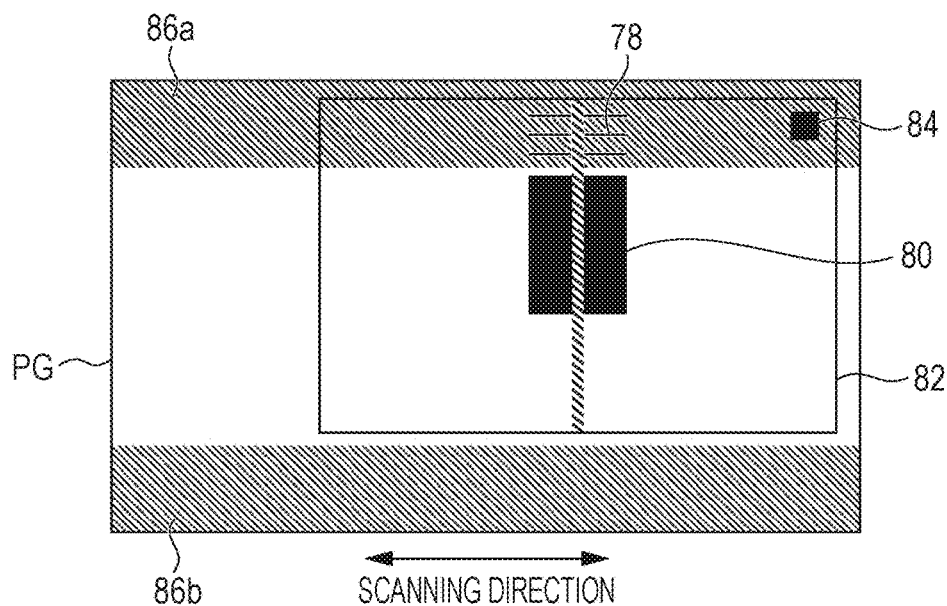
FIG. 9 is a view for explaining a position at the time of placement of an adjustment sheet on the platen.

In the example of FIG. 7, the guidance of "PLEASE PLACE ADJUSTMENT SHEET AT POSITION APPROX. 5 mm AWAY FROM UPPER EDGE" of the platen PG is given. However, "5 mm", which is the amount of distance away from the upper edge, is merely an example. The amount of distance away from the upper edge is determined in advance in the following manner. FIG. 8 is a top view of the platen PG. FIG. 8 illustrates an upper edge area 86a and a lower edge area 86b each of which is the area in which the first adjustment pattern 78 of the adjustment sheet 82 is to be placed. FIG. 9 is a bottom view (from the side of the exposure optical system 50) of the platen PG on which the adjustment sheet 82 is placed. FIG. 9 illustrates a state where the first adjustment pattern 78 of the adjustment sheet 82 is placed in the upper edge area 86a. The amount of distance by which the above-mentioned adjustment sheet is spaced away from the upper edge of the platen PG is determined in advance so that the first adjustment pattern 78 of the adjustment sheet 82 falls within the upper edge area 86a or the lower edge area 86b.

As illustrated in FIGS. 8 and 9, the upper edge area 86a and the lower edge area 86b extend and occupy along the scanning direction of the scanner (exposure optical system 50). The first adjustment pattern 78 of the adjustment sheet 82 falls within the upper edge area 86a or the lower edge area 86b of the platen PG, thus distortion of line segments which indicates the position of a fold line clearly appears in the later-described image of the first adjustment pattern. In other words, when the first adjustment pattern 78 of the adjustment sheet 82 is placed in an area other than the upper edge area 86a and the lower edge area 86b of the platen PG, distortion of line segments which indicates the position of a fold line is unlikely to appear in the image of the first adjustment pattern. In short, the upper edge area 86a and the lower edge area 86b of the platen PG can be called an effective area of the first adjustment pattern 78.

Returning to FIG. 4, in step S108, the controller 68 receives a read instruction for adjustment sheet via the UI 72. Specifically, when the "START TO SCAN ADJUSTMENT SHEET" button illustrated in FIG. 7 is touched, a read instruction for adjustment sheet is received. The controller 68 then controls the image reader 14 so that an image on the adjustment sheet is read. Specifically, the exposure optical system 50 (scanner) of the image reader 14 moves to scan the adjustment sheet, thereby reading an image on the adjustment sheet. Here, the direction (scanning direction), in which the exposure optical system 50 of the image reader 14 scans the adjustment sheet, is the crossing direction (the direction D of FIG. 6B) which crosses the direction (the direction C of FIG. 6B) along the fold of the adjustment sheet. Thus, distortion of line segments which indicates the position of a fold line clearly appears in the later-described image of the first adjustment pattern. In this manner, the image reader 14 reads the image of the adjustment sheet with the adjustment sheet unfolded, which has been folded by the fold unit 18.

Figure 10:
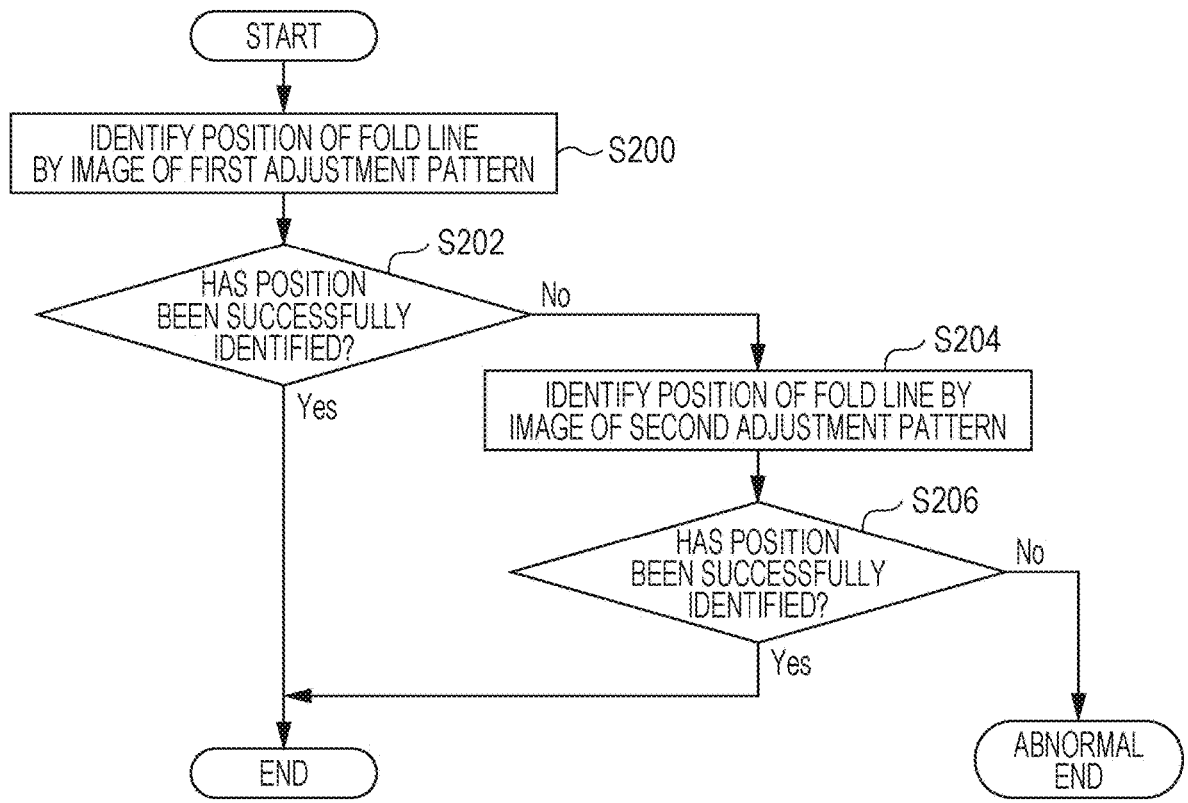
FIG. 10 is a flowchart illustrating the flow of processing of identifying the position of a fold line of an adjustment sheet.
Figure 11:
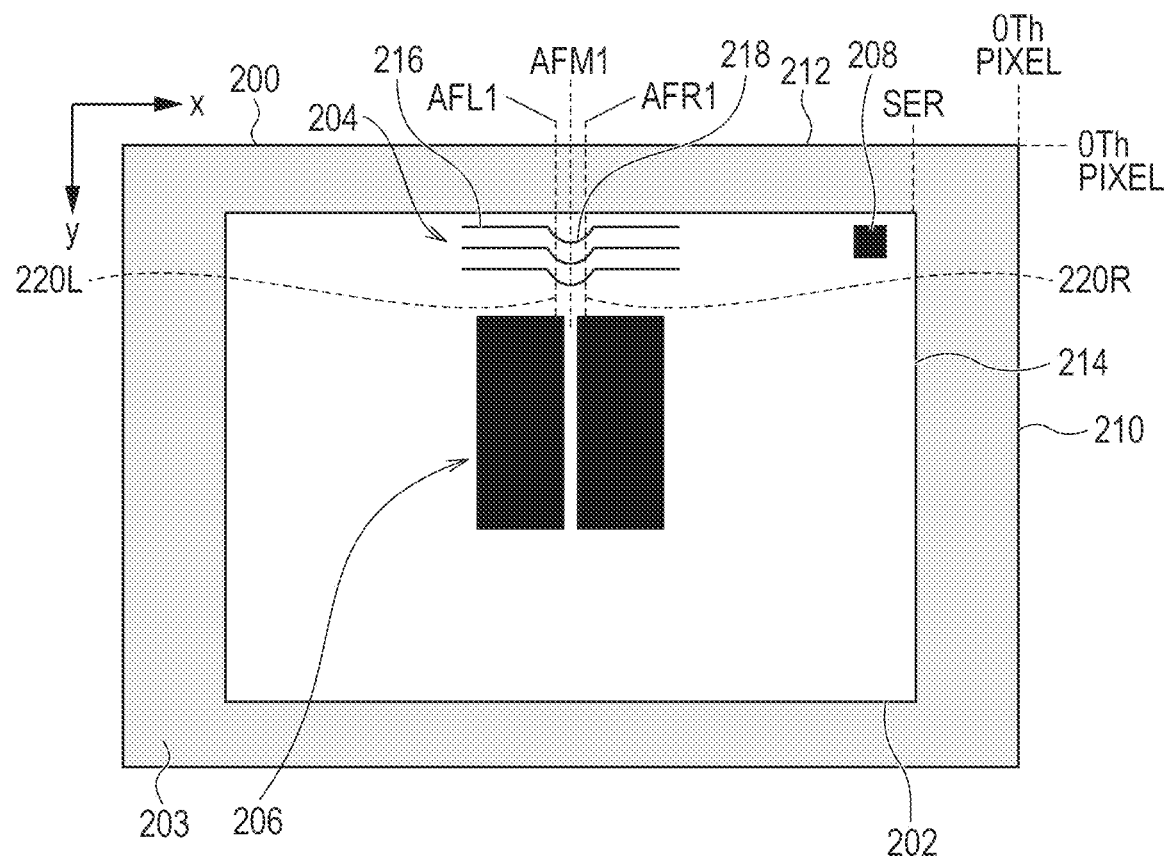
FIG. 11 is a view illustrating an example of an image of an adjustment sheet which has been read.

Next, in step S110 of FIG. 4, the controller 68 functions as the position identifying unit 74, and identifies the position of the fold line of the adjustment sheet using the image of the adjustment sheet. FIG. 10 is a flowchart illustrating the flow of processing of identifying the position of a fold line of the adjustment sheet. FIG. 11 illustrates an example of a read image 200a of the adjustment sheet. When the read image of the adjustment sheet is a color image, the image may be converted from a color image into a monochrome image by a publicly known method in related art. FIG. 11 illustrates an image after the conversion. As illustrated in FIG. 11, the image 200a of the adjustment sheet has an adjustment sheet section 202 (white section of FIG. 11), and an outer-side section 203 (gray section of FIG. 11) of the adjustment sheet section 202. An image 204 of the first adjustment pattern, an image 206 of the second adjustment pattern, and an image of the reference edge mark (a reference edge mark image 208) appear on the adjustment sheet section 202.

The manner in which the fold line section of the adjustment sheet 82 floats off the platen PG varies, for instance, depending on the paper characteristics of the adjustment sheet 82 (recording paper), such as firmness, thickness, and an intensity of pressing a platen cover (the bottom surface of the automatic document transporter 44 in the exemplary embodiment) against the adjustment sheet on the platen PG. When the manner varies in which the fold line section of the adjustment sheet 82 floats off, the image 200 (the image 204 of the first adjustment pattern, the image 206 of the second adjustment pattern) of the adjustment sheet, read by the image reader 14 varies. When the fold line section of the adjustment sheet 82 significantly floats off, the distortion of line segments indicating the position of a fold line clearly appears in the image 204 of the first adjustment pattern, however, the white section (described below) indicating the position of a fold line becomes blurred in the image 206 of the second adjustment pattern. In other words, when the fold line section of the adjustment sheet 82 significantly floats off, the position of a fold line is identifiable by using the image 204 of the first adjustment pattern, however, the position of a fold line is not identifiable by using the image 206 of the second adjustment pattern. On the other hand, when the fold line section of the adjustment sheet 82 slightly floats off, the distortion of line segments indicating the position of a fold line is unlikely to appear in the image 204 of the first adjustment pattern, however, the white section indicating the position of a fold line clearly appears in the image 206 of the second adjustment pattern. In other words, when the fold line section of the adjustment sheet 82 slightly floats off, the position of a fold line is not identifiable by using the image 204 of the first adjustment pattern, however, the position of a fold line is identifiable by using the image 206 of the second adjustment pattern. Thus, in the exemplary embodiment, the position of a fold line of the adjustment sheet 82 is identified by using the image 204 of the first adjustment pattern and the image 206 of the second adjustment pattern in a complementary manner.

Next, the processing of identifying the position of a fold line of the adjustment sheet 82 will be described with reference to FIG. 10. First, in step S200, the controller 68 (position identifying unit 74) identifies the position of a fold line using the image 204 of the first adjustment pattern. Here, an example of a method of identifying the position of a fold line using the image 204 of the first adjustment pattern will be described.

As illustrated in FIG. 11, in the image 204 of the first adjustment pattern, a section of a line segment (for instance, a line segment 216) including a fold line appears in a distorted manner (see distortion 218). It is to be noted that the distortion of the line segment is exaggeratedly illustrated in FIG. 11 and FIGS. 12 to 14 described later. When the first adjustment pattern of the adjustment sheet is placed near the upper edge area 86a of the platen PG, the line segment is distorted downward as illustrated in FIG. 11. When the first adjustment pattern of the adjustment sheet is placed near the lower edge area 86b of the platen PG, the line segment is distorted upward. If the first adjustment pattern of the adjustment sheet is placed in a central area (an area other than the upper edge area 86a and the lower edge area 86b) of the platen PG, the distortion of the line segment is extremely small.

The position identifying unit 74 identifies the position of a fold line by identifying the position of distortion of each line segment. Here, attention is focused on the line segment 216 out of multiple line segments, and a method of identifying the position of a fold line based on the distortion of the line segment 216 will be described with reference to FIGS. 11 and 12. First, the position of a fold line is identified by identifying the pixel position of the distortion of the line segment 216 in the crosswise direction (the x-axis direction) of FIG. 11. Specifically, the pixel position of the edge (the right edge 210 of the image) of the right side of the image is identified as the 0th pixel, the right side being the side on which the reference edge mark image 208 is present.

Figure 12:
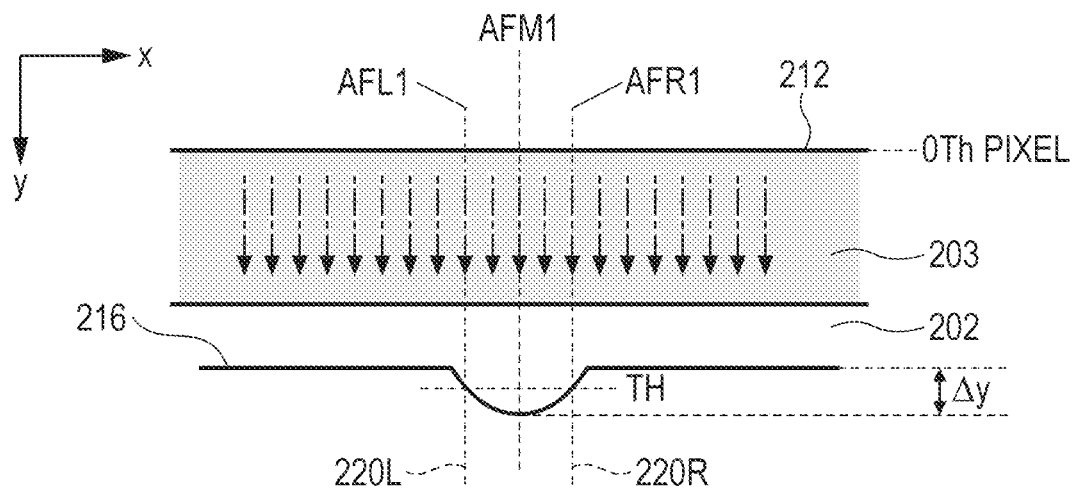
FIG. 12 is a view for explaining a method of identifying the position of a fold line from an image of the first adjustment pattern.

FIG. 12 is an enlarged view of the vicinity of the line segment 216. First, as indicated by each dashed-dotted line arrow of FIG. 12, the pixel position of the line segment 216 in the y-axis direction is detected in downward from the upper edge 212 of the image at predetermined intervals in the x-axis direction. The detection can be made by pattern matching or the like in related art. For instance, the upper edge 212 of the image is detected as the 0th pixel. Thus, the pixel positions yi (i=1 to n) in the y-axis direction of the line segment 216 for the pixel positions xi (i=1 to n) in the x-axis direction can be obtained. The pixel positions xi (i=1 to n) in the x-axis direction each having the largest one of the pixel positions yi (i=1 to n) in the y-axis direction, that is, the position of a peak of the distortion of the line segment 216 can be determined as a pixel position AFM1 (pixel position in the x-axis direction) of the fold line.

Also, the pixel position AFM1 of the fold line may be determined in the following manner. After one of the pixel positions yi (i=1 to n) in the y-axis direction of the line segment 216 for each of the pixel positions xi (i=1 to n) in the x-axis direction is obtained, a maximum value and a minimum value between the pixel positions yi are extracted, and the middle value of the maximum value and the minimum value is determined as a threshold TH. Then the pixel positions xi (i=1 to n) in the x-axis direction each having one of the pixel positions yi (i=1 to n) in the y-axis direction with at least the threshold TH are obtained. In FIGS. 11 and 12, the pixel positions in the x-axis direction between a pixel position AFL1 and a pixel position AFR1 are the obtained pixel positions. It is to be noted that in this case, between the pixel position AFL1 and the pixel position AFR1 is the area of the distortion of the line segment 216. The middle position between the pixel position AFL1 and the pixel position AFR1, in other words, the central position of the area of the distortion of the line segment 216 can be determined as the pixel position AFM1 (the pixel position in the x-axis direction) of the fold line. It is also possible to identify the position of the fold line by this method.

Although the pixel position AFM1 of the fold line is determined by one line segment 216 in the description above, the pixel position AFM1 of the fold line may also be determined by multiple line segments. For instance, when three line segments are printed on the adjustment sheet as in the exemplary embodiment, a temporary pixel position AFM1 of the fold line is calculated for each of those line segments by the above-described method, and for instance, the average value of temporary pixel positions can be the pixel position AFM1 of the fold line.

Figure 14:
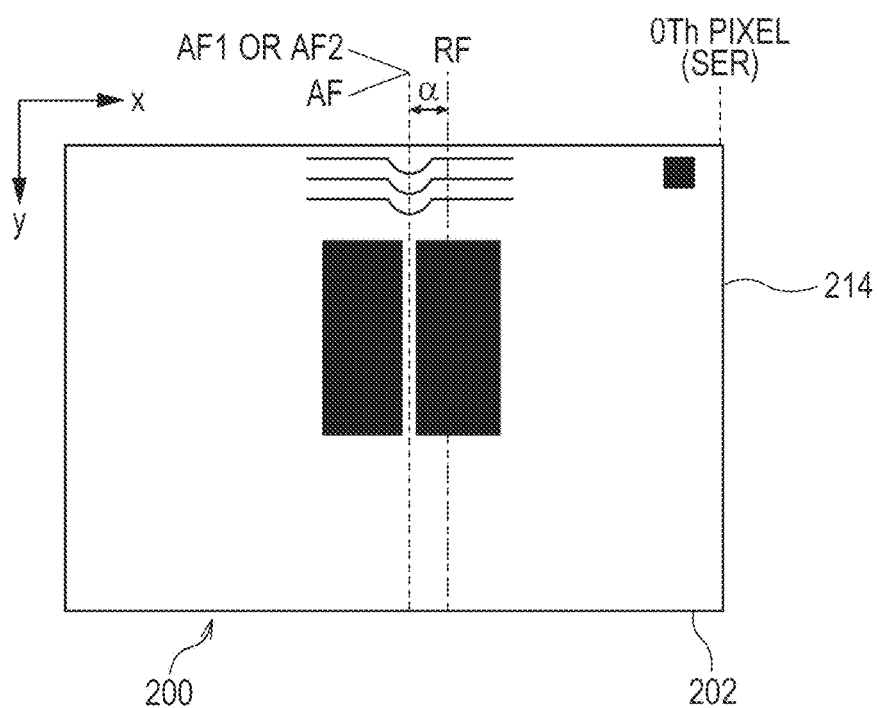
FIG. 14 is a view for explaining the difference between the position of a fold line and a reference fold position.

After the pixel position AFM1 of the fold line is determined, the position of the pixel position AFM is calculated when the edge of the adjustment sheet section 202 (right edge 214 of the adjustment sheet section) on the side (right side), on which the reference edge mark image 208 is present, is defined as the 0th pixel in the x-axis direction. It is to be noted that hereinafter the right edge 214 of the adjustment sheet section is also referred to as a reference edge 214. In order to calculate this, first a pixel position SER (pixel position in the x-axis direction) of the reference edge 214 when the right edge 210 of the image illustrated in FIG. 11 is defined as the 0th pixel is detected. The detection can be made by pattern matching, edge detection or the like in related art. The pixel position SER is then subtracted from the pixel position AFM1, thus the pixel position AFM1 (pixel position AF1) when the pixel position SER is defined as the 0th pixel can be calculated. FIG. 14 illustrates the pixel position AF1. The pixel position AF1 is the identified position of the fold line.

Returning to FIG. 10, the description of the flow of the processing of identifying the position of the fold line of the adjustment sheet is continued. In step S202 subsequent to S200, the controller 68 (the position identifying unit 74) determines whether or not the position of a fold line has been identified (determined whether or not identification is successful) using the image 204 of the first adjustment pattern. It is determined that the position of the fold line is not identifiable, for instance when the magnitude Δy (the difference between the maximum value and the minimum value of the pixel position of the line segment in the y-axis direction) of the distortion of the line segment 216 illustrated in FIG. 12 is less than a predetermined value (a first predetermined value). Specifically, when the distortion of the line segment does not appear in the image 204 of the first adjustment pattern and the position of the fold line cannot be identified, or when the distortion of the line segment is small and the position of the fold line cannot be accurately identified, the position identifying unit 74 determines that the position of the fold line is not identifiable.

In step S202 of FIG. 10, when the position of the fold line can be identified using the image 204 of the first adjustment pattern (Yes in step S202), the processing of identifying the position of the fold line is ended. On the other hand, when the position of the fold line cannot be identified using the image 204 of the first adjustment pattern (No in step S202), the flow proceeds to S204.

In step S204, the controller 68 (the position identifying unit 74) identifies the position of the fold line using the image 206 of the second adjustment pattern. Here, an example of a method of identifying the position of the fold line using the image 206 of the second adjustment pattern will be described.

Figure 13:
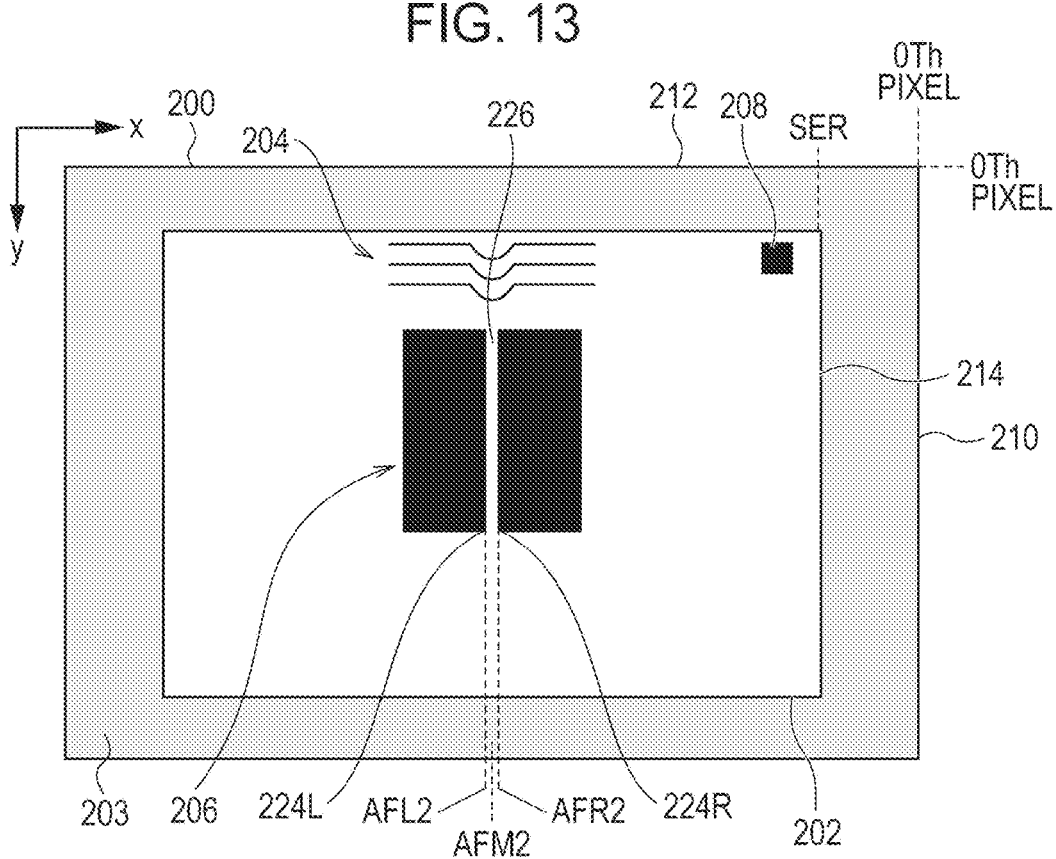
FIG. 13 is a view for explaining a method of identifying the position of a fold line from an image of the second adjustment pattern.

FIG. 13 is a view illustrating the image 200 of the same adjustment sheet as in FIG. 11, and the view is for explaining a method of identifying the position of the fold line using the image 206 of the second adjustment pattern. As illustrated in FIG. 13, the image 206 of the second adjustment pattern includes change sections 224L, 224R in the x-axis direction, in which the color changes from black color (or a highly concentrated color) to white color (a lowly concentrated color) which is the area of the fold line. The area including the fold line is between the change section 224L and the change section 224R, and hereinafter the area is referred to as the white section 226. The position identifying unit 74 of the controller 68 identifies a predetermined position of the white section 226 in the x-axis direction as the position of the fold line.

First, the pixel positions of the change sections 224L, 224R in the x-axis direction of FIG. 13 are detected. Specifically, the pixel position of the edge (the right edge 210 of the image) of the right side of the image is detected as the 0th pixel, the right side being the side on which the reference edge mark image 208 is present. The detection can be made by pattern matching, edge detection or the like in related art, for instance. FIG. 13 illustrates AFL2 as the pixel position of the change section 224L, and AFR2 as the pixel position of the change section 224R. As illustrated in FIG. 13, a pixel position AFM2 in the middle (the center) of the pixel position AFL2 and the pixel position AFR2 is determined. The pixel position AFM2 is also the pixel position when the position of the right edge 210 of the image is assumed to be the 0th pixel.

Next, similarly to the above-described identification of the position of the fold line using the image 204 of the first adjustment pattern, the position of the above-mentioned pixel position AFM2 when the right edge 214 of the adjustment sheet is assumed to be the 0th pixel in the x-axis direction is calculated. Specifically, the pixel position AFM2 under the assumption is calculated by subtracting the pixel position SER (the pixel position of the right edge 214 of the adjustment sheet) from the pixel position AFM2. FIG. 14 illustrates the position (pixel position) as an AF2. The AF2 provides the identified position of the fold line.

Returning to FIG. 10, the description of the flow of the processing of identifying the position of the fold line is continued. In step S206 subsequent to S204, the controller 68 (the position identifying unit 74) determines whether or not the position of the fold line has been identified (determined whether or not identification is successful) using the image 206 of the second adjustment pattern. The case where the position of the fold line is not identifiable is, for instance when the fold line of the adjustment sheet 82 significantly floats off on the platen PG, and the white section 226 illustrated in FIG. 13 becomes blurred. For instance, when the width of the white section 226 in the x-axis direction is a predetermined value (a second predetermined value) or greater, it is determined that the position of the fold line is not identifiable.

In step S206 of FIG. 10, when the position of the fold line can be identified using the image 206 of the second adjustment pattern (Yes in step S206), the processing of identifying the position of the fold line is ended. On the other hand, when the position of the fold line cannot be identified using the image 206 of the second adjustment pattern (No in step S206), the flow is abnormally ended. The abnormal end involves displaying (error display) a message stating that the position of the fold line is not identifiable, for instance on the UI 72, and ending the processing of identifying the position of the fold line.

It is to be noted that in the flow of FIG. 10, identification of the position of the fold line is first attempted using the image 204 of the first adjustment pattern, and subsequently, identification of the position of the fold line is attempted using the image 206 of the second adjustment pattern. However, identification of the position of the fold line may be first attempted using the image 206 of the second adjustment pattern, and subsequently, identification of the position of the fold line may be attempted using the image 204 of the first adjustment pattern.

Returning to FIG. 4, the description of the flow of the adjustment processing is continued. In step S112 subsequent to S110, the controller 68 obtains the difference between the position of the fold line and the reference fold position. The memory 70 stores the pixel position RF of the reference fold position with respect to the reference edge 214. FIG. 14 illustrates an example of the pixel position RF of the reference fold position. The controller 68 calculates the differential number α of pixels between the pixel position AF (AF1 or AF2) of the position of the fold line and the pixel position RF of the reference fold position. The product of the differential number α of pixels and a distance Di (mm) per pixel corresponds to the displacement amount of the fold position.

Next, in step S114 of FIG. 4, the controller 68 functions as the position adjusting unit 76, and sets an adjustment amount for the position of the fold line based on the differential number α of pixels between the pixel position AF of the position of the fold line and the pixel position RF of the reference fold position. The memory 70 stores the distance Di (mm) per pixel. As illustrated in FIG. 14, when the position AF of the identified fold line is on the left side of the reference fold position RF which is expected be the position of the fold line (when the differential number α of pixels is a positive value), an amount adjustments is set so that the position of the fold line is moved to the right side (closer to the reference edge 214) and matches the reference fold position RF. On the other hand, when the position AF of the identified fold line is on the right side of the reference fold position RF which is expected be the position of the fold line (when the differential number α of pixels is a negative value), an adjustment amount is set so that the position of the fold line is moved to the left side (away from the reference edge 214) and matches the reference fold position RF. The absolute value of the adjustment amount is the product of the differential number α of pixels and the distance Di per pixel. The calculated adjustment amount stored in the memory 70 in association with the type of paper and the fold pattern (set in FIGS. 5B and 5C). The adjustment amount is used when a user issues an instruction for fold processing on the recording paper via the UI 72 or the PC in a normal time.

The above-described flow of FIG. 4 is performed for each type of paper and for each fold pattern, and an adjustment amount corresponding to the type and fold pattern is stored in the memory 70. When a user issues an instruction for fold processing on the recording paper via the UI 72 or the PC, an adjustment amount corresponding to the set type of paper and fold pattern is read from the memory 70, and the fold position of the fold unit 18 is adjusted by the adjustment amount. In this manner, the controller 68 (the position adjusting unit 76) adjusts the fold position of the fold unit 18 based on the difference between the position of the identified fold line of the adjustment sheet and the reference fold position. It is to be noted that adjustment of the fold position is made, for instance, by adjusting the gate 62 of the folding mechanism illustrated in FIGS. 2A and 2B.

With the image forming device 10 in the exemplary embodiment described above, the position of a fold line can be identified using the image reader 14 (image scanner), and fold position adjustment can be performed. In particular, in the exemplary embodiment, the first adjustment pattern and the second adjustment pattern are formed in the adjustment sheet, and the position of a fold line can be identified by using the first and second adjustment patterns in a complementary manner. Specifically, when the fold line of the adjustment sheet 82 significantly floats off, the white section 226 becomes blurred in the image of the second adjustment pattern, and the fold line cannot be accurately identified. However, the distortion of each line segment clearly appears in the image of the first adjustment pattern, and thus the position of the fold line can be accurately identified using the image of the first adjustment pattern. On the other hand, when the fold line of the adjustment sheet slightly floats off, the distortion of each line segment is unlikely to appear in the image of the first adjustment pattern, and the fold line cannot be accurately identified. However, the white section 226 clearly (distinctly) appears in the image of the second adjustment pattern, and thus the position of the fold line can be accurately identified using the image of the second adjustment pattern.

In the image forming device 10 in the exemplary embodiment described above, the description is given using an example of half fold in which fold is created at one position. However, needless to say, the inner triple fold or the Z fold may be made, in which fold is created at two or more positions in the recording paper. In this case, the adjustment pattern (the first adjustment pattern and the second adjustment pattern) is printed for each of multiple positions at each of which one adjustment sheet is folded. For each of the positions of multiple fold lines of one adjustment sheet, the difference (the displacement amount) from the reference fold position is determined, and an adjustment amount for the fold position is obtained. That is, in the case of a folding pattern in which fold is created at two or more positions in the recording paper, adjustment amounts at multiple fold positions are obtained for one adjustment sheet.

Figure 15:
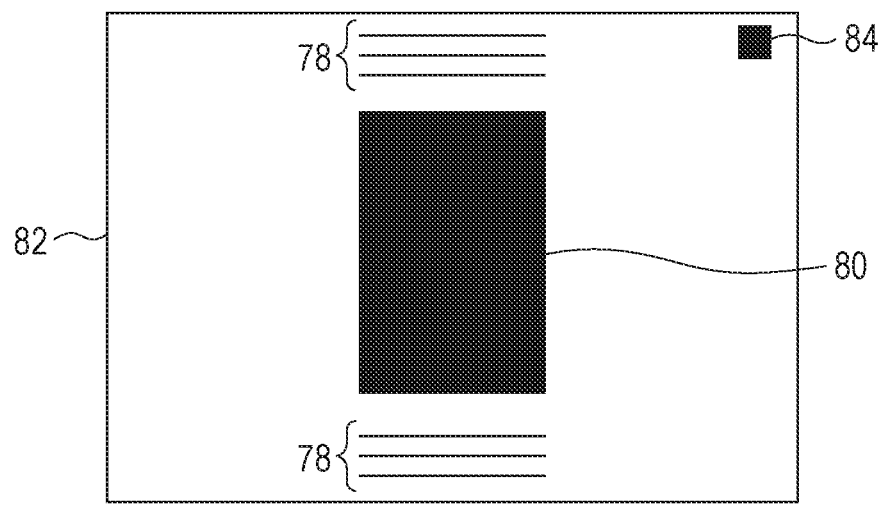
FIG. 15 is a view for explaining an adjustment pattern of another adjustment sheet.
Figure 16:
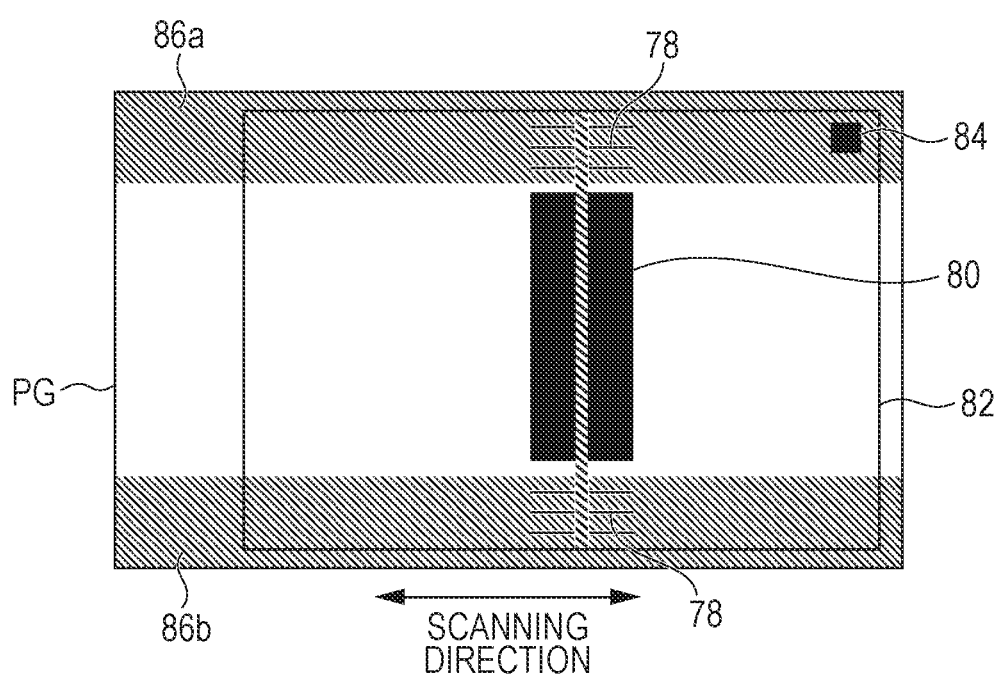
FIG. 16 is a view illustrating a state of the platen on which the adjustment sheet of FIG. 15 is placed.
Figure 17:
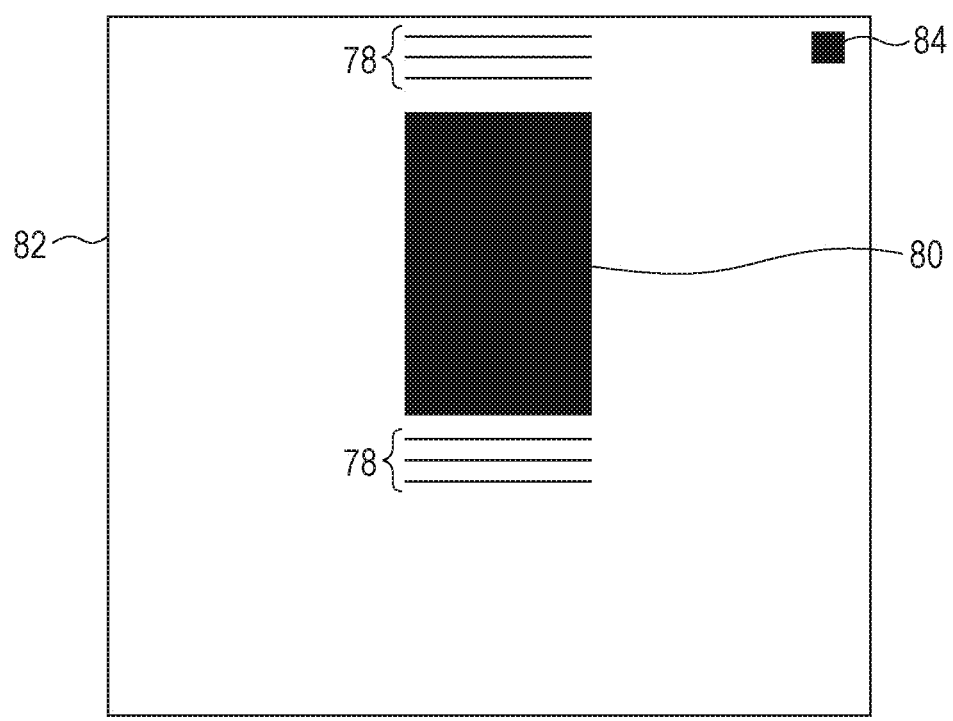
FIG. 17 is a view for explaining the adjustment pattern of another adjustment sheet.

Next, the adjustment pattern (the first adjustment pattern and the second adjustment pattern) of another adjustment sheet will be described. FIG. 15 illustrates an example of an adjustment pattern of another adjustment sheet, and the first adjustment pattern 78 is also printed near the lower edge of the adjustment sheet 82. FIG. 16 is a bottom view (from the side of the exposure optical system 50) of the platen PG on which the adjustment sheet 82 of FIG. 15 is placed. In FIG. 16, the first adjustment pattern 78 on the upper side of the adjustment sheet 82 is placed in the upper edge area 86a, and the first adjustment pattern 78 on the lower side is placed in the lower edge area 86b. In this manner, the first adjustment pattern 78 is printed at two locations, and thus two images of the first adjustment pattern can be obtained. The position of the fold line can be accurately identified by using the distortion of line segments which appears in each of the two images of the first adjustment pattern. For the adjustment sheet larger than the adjustment sheet of FIG. 15, as illustrated in FIG. 17, the adjustment patterns for the adjustment sheet are printed.

Figure 18:
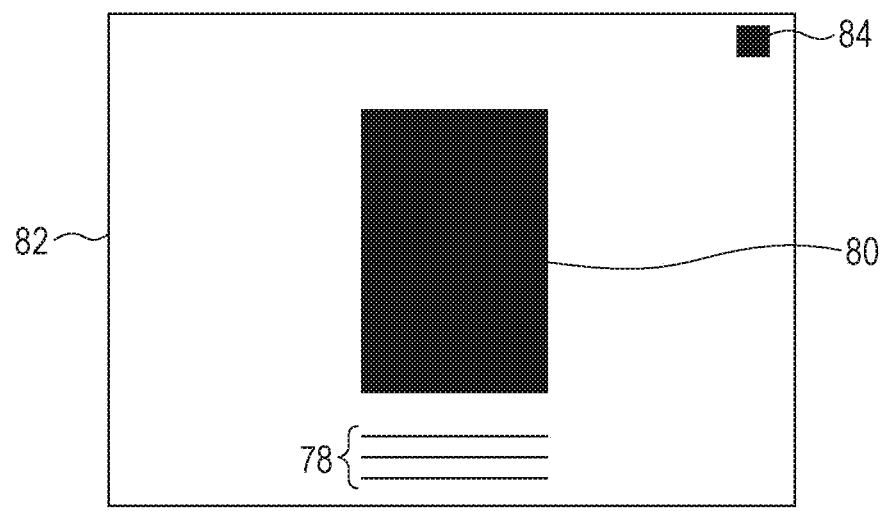
FIG. 18 is a view for explaining an adjustment pattern of another adjustment sheet.

FIG. 18 is an example of an adjustment pattern of still another adjustment sheet, and the first adjustment pattern 78 is printed only near the lower edge of the adjustment sheet 82. In the case of the adjustment sheet 82, the first adjustment pattern 78 of the adjustment sheet 82 is placed, for instance, in the lower edge area 86b of the platen PG.

Figure 19:
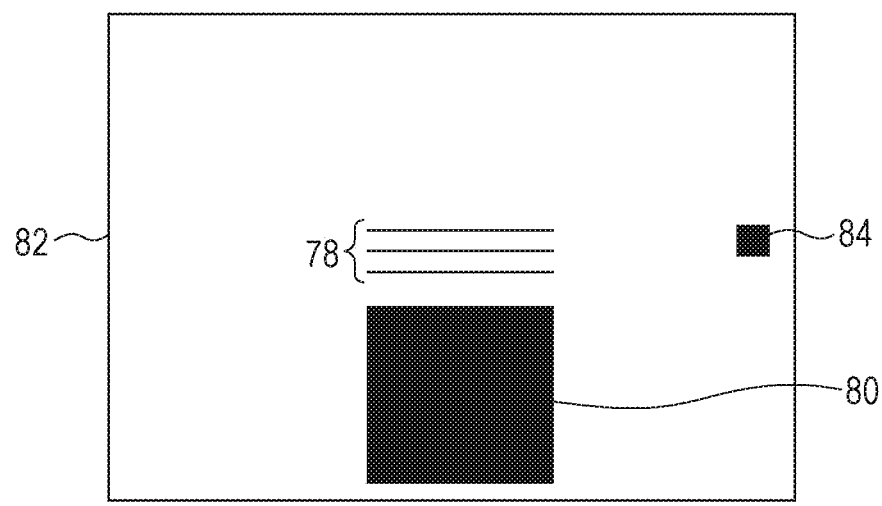
FIG. 19 is a view for explaining an adjustment pattern of another adjustment sheet.

FIG. 19 is an example of an adjustment pattern of still another adjustment sheet, and the first adjustment pattern 78 is printed near the center of the adjustment sheet 82, and the second adjustment pattern 80 is printed near the lower edge of the adjustment sheet 82. In the case of the adjustment sheet, the first adjustment pattern 78 of the adjustment sheet 82 is placed, for instance, in the upper edge area 86a of the platen PG. In the case of the adjustment sheet of FIG. 19, when the first adjustment pattern 78 is placed on the upper edge area 86a of the platen PG, the portion above the first adjustment pattern 78 may lie off the platen PG. Thus, when the portion lying off the platen PG is reduced, and a wider range in the adjustment sheet is desired to be read by the image reader 14, the first adjustment pattern 78 may be printed near the upper edge (or near the lower edge) of the adjustment sheet.

Figure 20:
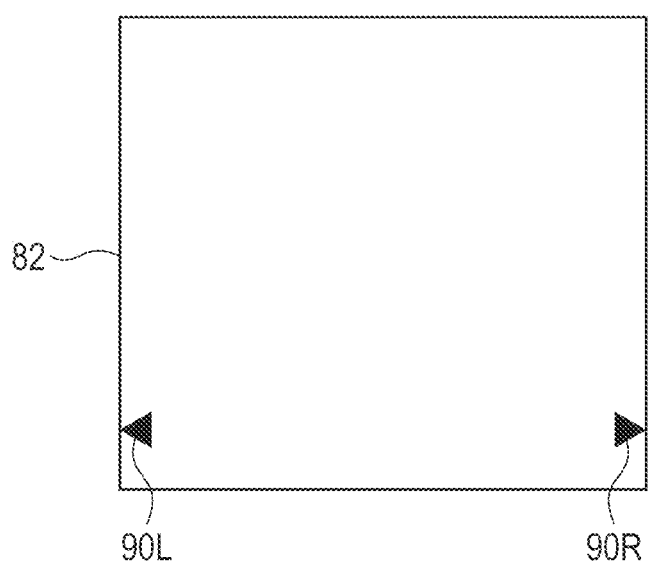
FIG. 20 is a view illustrating a state of an adjustment sheet on which an alignment mark is formed.
Figure 21:
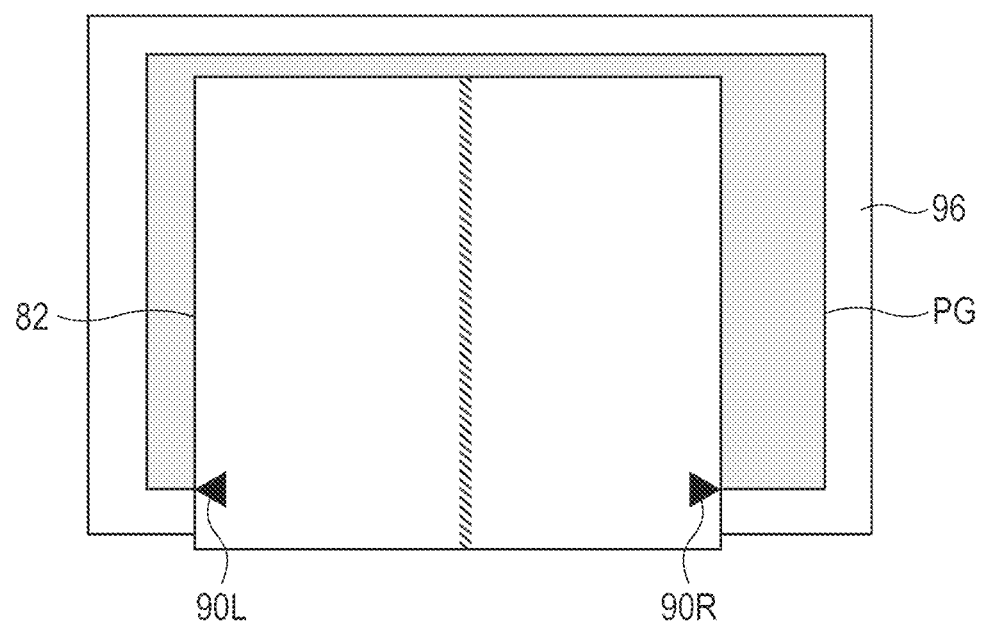
FIG. 21 is a view illustrating a state in which an adjustment sheet is aligned with a platen using an alignment mark of the adjustment sheet.

Next, the alignment when the adjustment sheet is placed on the platen PG will be described. In order to reliably place the first adjustment pattern 78 of the adjustment sheet 82 in the upper edge area 86a or the lower edge area 86b of the platen PG, an alignment mark may be printed on the back surface (the surface opposite to the surface on which the adjustment pattern is printed) of the adjustment sheet. FIG. 20 is an example of alignment marks 90L, 90R which are printed on the back surface of the adjustment sheet. FIG. 21 is a view illustrating a state in which the adjustment sheet of FIG. 20 is placed on the platen PG. As illustrated in FIG. 21, the position of the adjustment sheet on the platen PG is determined by aligning the alignment marks 90L, 90R with the boundary between the platen PG and a platen frame 96 (the frame of the platen PG). Here, the alignment marks 90L, 90R are printed on the back surface of the adjustment sheet so that when the alignment marks 90L, 90R are aligned with the boundary between the platen PG and the platen frame 96, the first adjustment pattern falls within the upper edge area or the lower edge area of the platen PG. It is possible for the first adjustment pattern to reliably fall within the upper edge area or the lower edge area of the platen PG by such alignment marks.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An image forming device comprising:
 a folding member configured to fold an adjustment sheet on which a first adjustment pattern including at least one line segment, and a second adjustment pattern filled in with a highly concentrated color are formed, based on a predetermined reference fold position so that the adjustment sheet is folded across the first adjustment pattern and the second adjustment pattern;
 an image reader configured to read an image of the first adjustment pattern of the adjustment sheet and an image of the second adjustment pattern of the adjust- ment sheet with the adjustment sheet having been folded by the folding member and then unfolded;

a memory having stored therein program instructions;

at least one processor configured to execute the instructions to implement:
- a position identifying unit configured to identify a position of at least one of a fold line based on distortion of the at least one line segment, which appears on the image of the first adjustment pattern, and a fold line which appears on the image of the second adjustment pattern; and
- a position adjusting unit configured to adjust a fold position of the folding member based on a difference between the position of the fold line identified by the position identifying unit and the reference fold position.

2. The image forming device according to claim 1, wherein the first adjustment pattern is formed in an area near an edge of the adjustment sheet, and the second adjustment pattern is formed in an area inwardly of the first adjustment pattern.

3. The image forming device according to claim 1, wherein the image reader includes a scanner that relatively scans the adjustment sheet, and reads the image of the first adjustment pattern and the image of the second adjustment pattern, and a scanning direction of the scanner is a crossing direction which crosses a direction along the fold line of the adjustment sheet.

4. The image forming device according to claim 2, wherein the image reader includes a scanner that relatively scans the adjustment sheet, and reads the image of the first adjustment pattern and the image of the second adjustment pattern, and a scanning direction of the scanner is a crossing direction which crosses a direction along the fold line of the adjustment sheet.

5. The image forming device according to claim 3, wherein the image reader includes a platen on which the adjustment sheet is placed, the platen has an upper edge area and a lower edge area that extend along the scanning direction of the scanner, and the first adjustment pattern is formed on the adjustment sheet so that when the adjustment sheet is placed on the platen, the first adjustment pattern is near at least one of the upper edge area and the lower edge area of the platen.

6. The image forming device according to claim 4, wherein the image reader includes a platen on which the adjustment sheet is placed, the platen has an upper edge area and a lower edge area that extend along the scanning direction of the scanner, and the first adjustment pattern is formed on the adjustment sheet so that when the adjustment sheet is placed on the platen, the first adjustment pattern is near at least one of the upper edge area and the lower edge area of the platen.

7. The image forming device according to claim 5, wherein first adjustment patterns, each of which is the first adjustment pattern, are formed at two locations across the second adjustment pattern in the adjustment sheet, the first adjustment patterns at the two locations are formed in the adjustment sheet so that when the adjustment sheet is placed on the platen, the first adjustment patterns at the two locations are near the upper edge area and the lower edge area, respectively, of the platen.

8. The image forming device according to claim 6, wherein first adjustment patterns, each of which is the first adjustment pattern, are formed at two locations across the second adjustment pattern in the adjustment sheet, the first adjustment patterns at the two locations are formed in the adjustment sheet so that when the adjustment sheet is placed on the platen, the first adjustment patterns at the two locations are near the upper edge area and the lower edge area, respectively, of the platen.

9. The image forming device according to claim 5, wherein on a back surface of the adjustment sheet with a surface on which the first adjustment pattern and the second adjustment pattern are formed, an alignment mark is formed, a position at which the adjustment sheet is placed on the platen is determined by aligning the alignment mark of the adjustment sheet with a boundary between the platen and a frame of the platen.

10. The image forming device according to claim 6, wherein on a back surface of the adjustment sheet with a surface on which the first adjustment pattern and the second adjustment pattern are formed, an alignment mark is formed, and a position at which the adjustment sheet is placed on the platen is determined by aligning the alignment mark of the adjustment sheet with a boundary between the platen and a frame of the platen.

11. The image forming device according to claim 1, wherein when the position of the fold line is not identifiable based on the distortion of the line segment, which appears on the image of the first adjustment pattern, the position identifying unit identifies the position of the fold line based on a fold line which appears on the image of the second adjustment pattern, and when the position of the fold line is not identifiable based on the fold line which appears on the image of the second adjustment pattern, the position identifying unit identifies the position of the fold line based on the distortion of the line segment, which appears on the image of the first adjustment pattern.

12. The image forming device according to claim 2, wherein when the position of the fold line is not identifiable based on the distortion of the line segment, which appears on the image of the first adjustment pattern, the position identifying unit identifies the position of the fold line based on a fold line which appears on the image of the second adjustment pattern, and when the position of the fold line is not identifiable based on the fold line which appears on the image of the second adjustment pattern, the position identifying unit identifies the position of the fold line based on the distortion of the line segment, which appears on the image of the first adjustment pattern.

13. The image forming device according to claim 3, wherein when the position of the fold line is not identifiable based on the distortion of the line segment, which appears on the image of the first adjustment pattern, the position identifying unit identifies the position of the fold line based on a fold line which appears on the image of the second adjustment pattern, and when the position of the fold line is not identifiable based on the fold line which appears on the image of the second adjustment pattern, the position identifying unit identifies the position of the fold line based on the distortion of the line segment, which appears on the image of the first adjustment pattern.

14. The image forming device according to claim 4,
wherein when the position of the fold line is not identifiable based on the distortion of the line segment, which appears on the image of the first adjustment pattern, the position identifying unit identifies the position of the fold line based on a fold line which appears on the image of the second adjustment pattern, and when the position of the fold line is not identifiable based on the fold line which appears on the image of the second adjustment pattern, the position identifying unit identifies the position of the fold line based on the distortion of the line segment, which appears on the image of the first adjustment pattern.

15. The image forming device according to claim 5,
wherein when the position of the fold line is not identifiable based on the distortion of the line segment, which appears on the image of the first adjustment pattern, the position identifying unit identifies the position of the fold line based on a fold line which appears on the image of the second adjustment pattern, and when the position of the fold line is not identifiable based on the fold line which appears on the image of the second adjustment pattern, the position identifying unit identifies the position of the fold line based on the distortion of the line segment, which appears on the image of the first adjustment pattern.

16. The image forming device according to claim 1, wherein the highly concentrated color is black.

17. An image forming device comprising
an image former that forms on a sheet a first adjustment pattern including at least one line segment, and a second adjustment pattern filled in with a highly concentrated color, the first and second adjustment patterns arranged on an area of the sheet to be folded such that when the sheet is folded by a folding member creating a fold line and then unfolded, the first and second adjustment patterns cross the fold line, and a position of the fold line can be identified from an image of the unfolded sheet.

18. The image forming device according to claim 17,
wherein the image former forms the first adjustment pattern in an area near an edge of the sheet, and forms the second adjustment pattern in an area inwardly of the first adjustment pattern.

19. The image forming device according to claim 17, wherein the highly concentrated color is black.

20. A method comprising:
folding an adjustment sheet on which a first adjustment pattern including at least one line segment, and a second adjustment pattern filled in with a highly concentrated color are formed, based on a predetermined reference fold position so that the adjustment sheet is folded across the first adjustment pattern and the second adjustment pattern;

reading an image of the first adjustment pattern of the adjustment sheet and an image of the second adjustment pattern of the adjustment sheet with the adjustment sheet having been folded by a folding member and then unfolded;

identifying a position of at least one of a fold line based on distortion of the at least one line segment, which appears on the image of the first adjustment pattern, and a fold line which appears on the image of the second adjustment pattern; and adjusting a fold position of the folding member based on a difference between the identified position of the fold line and the reference fold position.

* * * * *